United States Patent

Anderson

Patent Number: 5,860,312
Date of Patent: Jan. 19, 1999

[54] BENDING BRAKE APPARATUS

[76] Inventor: Carl E. Anderson, 1011 Capouse Ave., Scranton, Pa. 18509

[21] Appl. No.: 563,997

[22] Filed: Nov. 29, 1995

[51] Int. Cl.[6] ...................................................... B21D 5/04
[52] U.S. Cl. ................................. 72/294; 72/319; 108/90
[58] Field of Search ............................ 72/294, 319–321, 72/464, 331, 337, 129, 131; 108/90, 67

[56] References Cited

U.S. PATENT DOCUMENTS

| 537,663 | 4/1895 | Wurster | 72/319 |
|---|---|---|---|
| 1,126,611 | 1/1915 | Wright | 108/67 |
| 3,380,158 | 4/1968 | DuBois . | |
| 3,771,440 | 11/1973 | Eburn | 72/294 |
| 3,796,201 | 3/1974 | Golub | 72/294 |
| 4,033,388 | 7/1977 | Ruegger | 72/294 |
| 4,351,176 | 9/1982 | Anderson . | |
| 4,364,254 | 12/1982 | Chubb | 72/294 |
| 4,918,966 | 4/1990 | Raccioppi | 72/319 |
| 4,958,577 | 9/1990 | Demaio | 108/67 |
| 5,036,740 | 8/1991 | Tsai | 83/455 |
| 5,404,739 | 4/1995 | George | 72/294 |
| 5,538,147 | 7/1996 | Fucci | 108/90 |
| 5,582,053 | 12/1996 | Chubb | 72/294 |
| 5,706,692 | 1/1998 | Chubb | 72/294 |

FOREIGN PATENT DOCUMENTS

| 2504429 | 10/1982 | France | 72/332 |
|---|---|---|---|
| 56-77026 | 6/1981 | Japan | 72/294 |

OTHER PUBLICATIONS

A sales brochure for Tapco PRO –III Port–O–Bender, 1994, Tapco International Corp.

Primary Examiner—Daniel C. Crane
Attorney, Agent, or Firm—Helfgott & Karas, P.C.

[57] ABSTRACT

A bending brake apparatus having a bending brake, an attached foldable table, a coil holder for holding coiled aluminum or coiled vinyl sheet material positioned at an end of the bending brake before the table and facing down the length of the table, built-in cutting means separately provided on the bending brake and on the coil holder for cutting the aluminum or vinyl sheet material, and detachable brake support leg pairs. The built-in cutting means includes cutting tools mounted on sliding bars slideably captured within rimmed tracks. The cutting tools employ offset roller cutters and include outwardly extending sheet material support rollers.

14 Claims, 5 Drawing Sheets

BENDING BRAKE APPARATUS

BACKGROUND OF THE INVENTION

1. Field of the Invention

This invention relates, generally, to a bending brake, and, more particularly, to a bending brake apparatus having a coil holder for holding coiled aluminum or coiled vinyl sheet material, built-in means for cutting the aluminum or vinyl sheet material, an attached worktable, and pairs of detachable brake support legs.

2. Background Art

Bending brakes are utilized in numerous industries, especially in the aluminum siding industry, to bend workpieces of substantially flat sheet material (eg. aluminum), in situ, through a wide range of angles. A bending brake is described in U.S. Pat. No. 4,351,176 by the present inventor. Such bending brake is now also being used to bend vinyl material that, like aluminum, is formed into coils to promote transportability.

While coils of aluminum or vinyl material are easy to transport, they are awkward to work with, in conjunction with a standard bending brake, at a job site. Typically, more than one job station is needed for processing coiled material. Before placing a sheet of coiled aluminum or coiled vinyl stock into a standard bending brake located at a job site, one must cut off a portion of the sheet by hand using a utility knife or shears, place such portion on a separate work table, and then measure it and mark it for subsequent bending and/or cutting. This aggravating, time-consuming, and generally unwieldy process, colloquially known in the art as "rolling in the mud," has often been blamed for workproduct damage characterized by uneven (less than perpendicular) cuts, scratches, "scalloped" edges, burrs, and dents. The process also poses the threat of serious bodily injury to those who use utility knives or shears with unsteady hands.

Separate hand-held cutting tools employing offset roller cutters have been suggested as replacements for utility knives or shears for use in conjunction with bending brakes (eg. the PRO CUT-OFF manufactured by Tapco International Corporation of Plymouth, Mich.). Such separate cutting tools, however, are subject to certain disadvantages and/or operating difficulties. For example, it is difficult to accurately guide such a cutting tool during the cutting operation. This can result in uneven cuts. It is also difficult to generate workproduct free from other irregularities, such as the above-mentioned scalloped edges, scratches, and burrs, when using a separate cutting tool. Moreover, the roller cutters themselves tend to break easily—especially when the separate cutting tools are dropped. This happens quite frequently since workers tend to forget to remove the separate cutting tools from conventional bending brakes prior to bending material in such brakes thereby allowing the motion of the brakes during bending to knock the cutting tools to the ground.

Properly aligning material measured and marked for cutting in a typical bending brake is also difficult to accomplish. One must take additional measurements along the entire length of the material to be cut to predict where the roller cutters of a conventional cutting tool will slit such material. Usually, the material will shift during this process forcing one to recheck the alignment thereof. Because of this, more than one person is often needed to manually guide the material into the brake and hold it there to ensure that it does not shift before it is clamped into place prior to cutting.

Typical bending brakes also have pairs of support legs that are bolted or otherwise fixed thereon and usually foldable thereunder. Such fixed leg pairs tend to seriously impede the process of loading/unloading the brakes onto/from the roof racks of pickup trucks used to transport the brakes from job site to job site. Moreover, the fixed leg pairs prevent the brakes from being used directly on scaffolds forcing workers to pass aluminum or vinyl material down from the scaffolds every time they need to cut, bend, or otherwise manipulate such material.

There is a pressing need, therefore, for an apparatus that will allow coiled sheets of aluminum or vinyl material to be easily, safely, and accurately cut, bent, and/or otherwise manipulated, in situ, by a readily transportable bending brake apparatus, to generate workproduct free of irregularities.

OBJECTS OF THE INVENTION

It is an object of the present invention to provide a bending brake apparatus that holds coiled sheet material such as coiled aluminum or vinyl sheet material.

It is a further object of the present invention to provide a bending brake apparatus that provides built-in means for cutting sheet material, such as aluminum or vinyl sheet material, without causing uneven cuts, scratches, scalloped edges, burrs, dents, or other irregularities.

It is a still further object of the present invention to provide a bending brake apparatus that allows one or more operators to align, bend, cut, and otherwise manipulate sheet material, such as aluminum or vinyl sheet material, in situ, at a job site in a safe and easy manner.

It is another object of the present invention to provide a bending brake apparatus that is readily transportable within and between job sites.

These and other objects and advantages of the present invention will become apparent from review and consideration of the attached description of the invention, appended claims, and accompanying drawings.

SUMMARY OF THE INVENTION

The present invention is directed to a bending brake apparatus that satisfies the need for a readily transportable apparatus that will allow coiled sheets of aluminum or vinyl material to be easily and safely cut, bent, and otherwise manipulated, in situ, at a job site to generate workproduct free of irregularities.

A coil holder is positioned at an end of a bending brake and before a foldable brake table attached to the bending brake so that aluminum or vinyl sheet material may be fed from a coil of such material through a clamping mouth formed of a transverse bar coupled to two standard clamps interconnected by a manipulating handle. A track having rims is formed beneath the clamping mouth. A cutting tool somewhat similar to that described in U.S. Pat. No. 3,380,158 is mounted on a sliding bar captured under the rims within the track. A sheet material support roller extending outwardly from the side of the cutting tool prevents the weight of the sheet material itself from forcing the sheet down during cutting and causing the edges of the cut sheet to become scalloped or otherwise deformed. Once the clamped aluminum or vinyl sheet is cut by the cutting tool, the cut sheet may be conveniently measured and marked on the brake table and then fed through the jaws of the bending brake and bent as needed. The bending brake incorporates a similar type of rimmed track and cutting tool so that the sheets of the aluminum or vinyl material can be cut on the brake itself. An elongated flat rigid hinged guide flap runs along the full length of the bending brake above the rimmed track. The flap serves as a guide for aligning material in the brake prior to cutting and bending. Pairs of detachable bending brake support legs connect to the underside of the brake at its ends via integral interlocking members that secure to bending brake support castings.

BRIEF DESCRIPTION OF THE DRAWINGS

In the various figures of the drawings, like reference characters designate like parts.

DETAILED DESCRIPTION OF THE INVENTION

Figure 1:
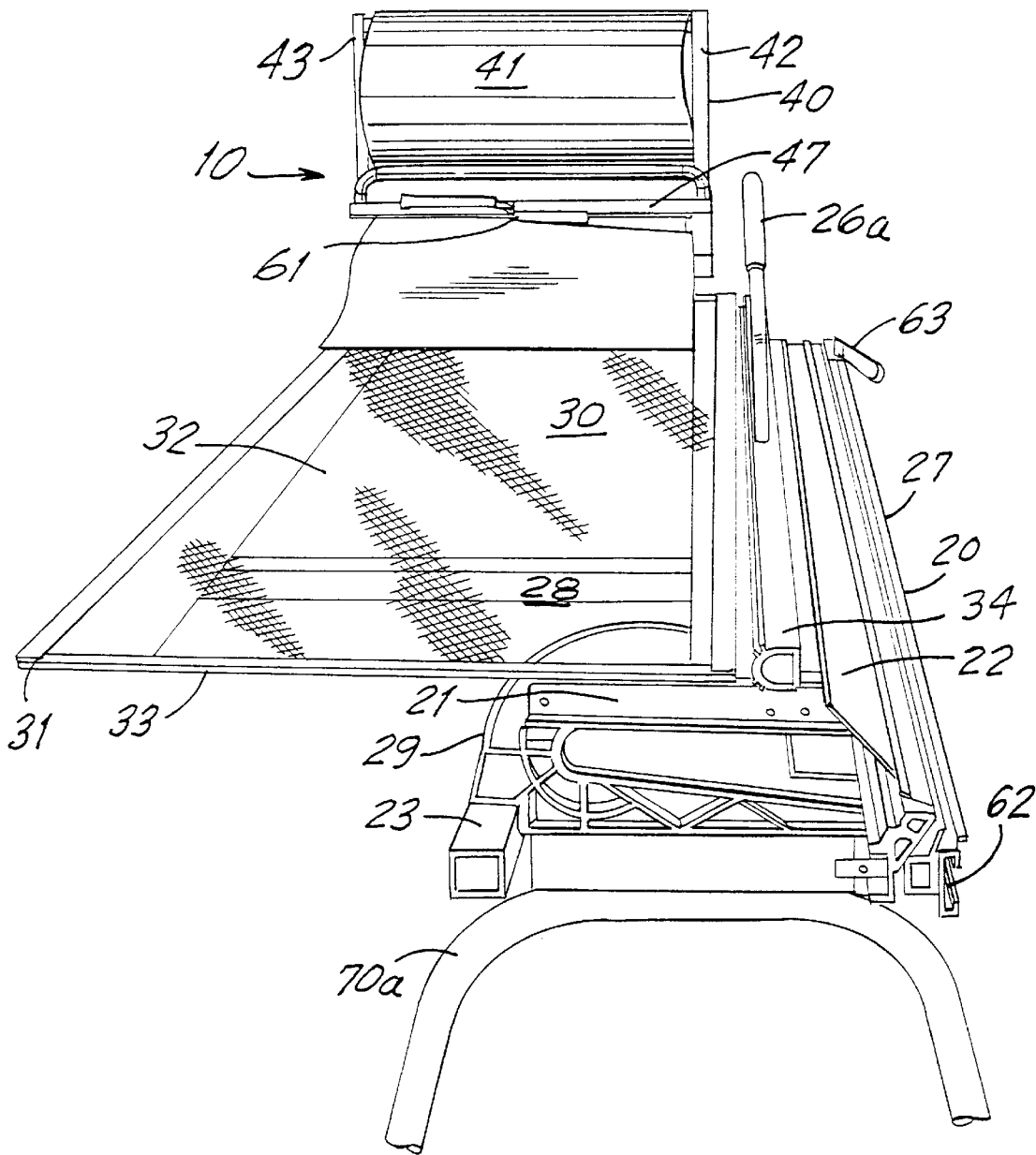
FIG. 1 is a perspective view of the bending brake apparatus of the present invention.
Figure 2:
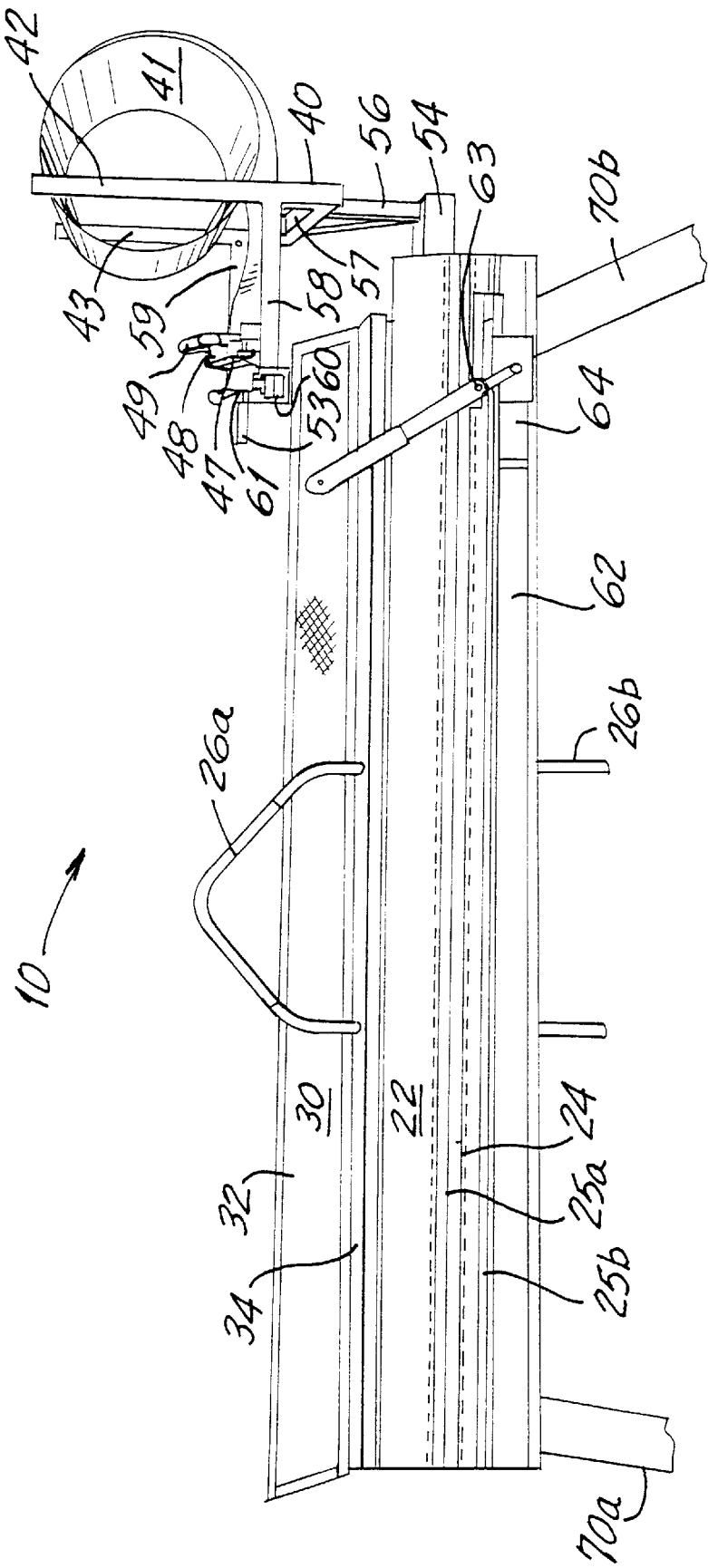
FIG. 2 is a side perspective view of the bending brake apparatus of the present invention.

Referring to FIGS. 1 and 2, the bending brake apparatus 10 of the present invention includes a bending brake 20, a brake table 30, and a coil holder 40. The bending brake 20 has a front side or working side 27 and a back side 29 opposite the working side 29. The bending brake includes support castings 21 having front edges and back edges. The support castings 21 are held spaced apart by a horizontal support rod 23. As can best be seen in FIG. 2, the bending brake 20 further includes a workpiece bending door 24 having at least one downwardly depending bending handlebar 26b for controlling the bending of sheet material placed in the workpiece bending door, an upper workpiece clamping jaw 25a, an upper clamping handle 26a extending upwardly from a horizontal clamping rod 34 running the length of the bending brake for opening and closing the upper workpiece clamping jaw, and a lower workpiece clamping jaw 25b. The clamping jaws 25a and 25b and the workpiece bending door 24 are connected at the front edges of the support castings 21.

Figure 3:
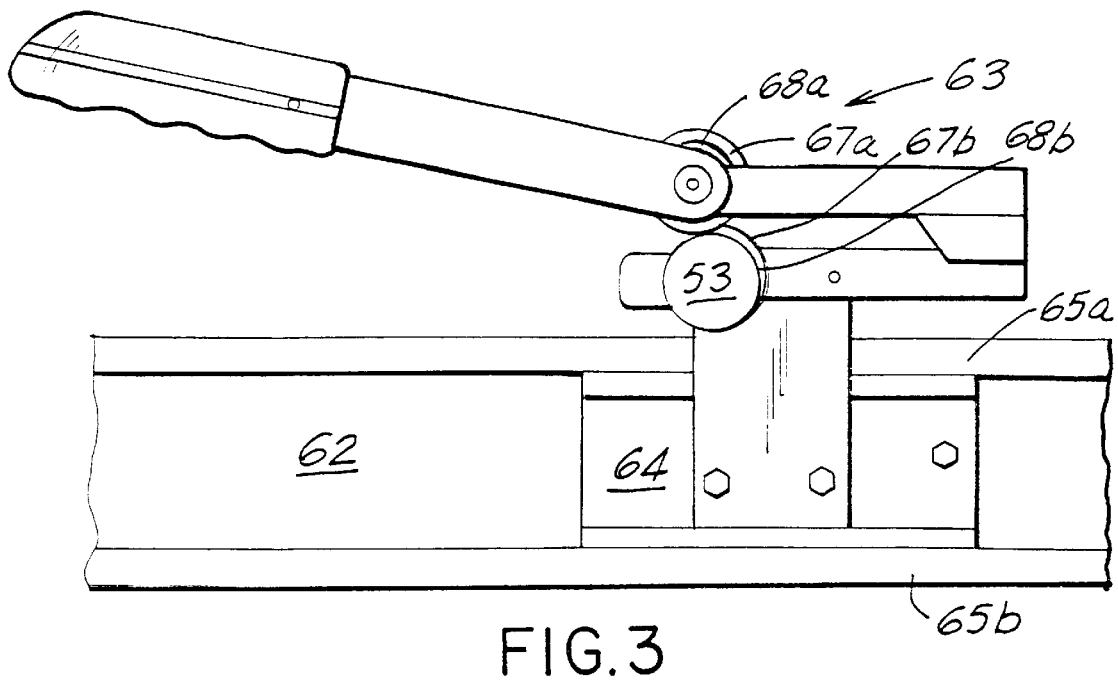
FIG. 3 is a side view of the preferred cutting tool of the bending brake apparatus of the present invention.

Referring to FIGS. 1, 2, and 3, a first track 62 depends vertically in a downward direction from the front side 27 of the bending brake 20 which is mounted to a front surface of bending door 24 and runs along the length thereof. As can best be seen in FIG. 3, first cutting means 63 is mounted upright on a first sliding bar 64 disposed sideways and slideably captured beneath first rim portions 65a and 65b within the first track 62. Preferably, a portion of the first sliding bar 64 will protrude slightly past the first rim portions 65a and 65b and will be tapered slightly along its length in the direction of the cutting path to ease its passage through the first track 62. Without the taper, the first cutting means would tend to direct inward into the surface of the first track when pulled along the first track during cutting resulting in noticeable added frictional resistance. Generally, the first cutting means 63 is a cutting tool of a type somewhat similar to that described in U.S. Pat. No. 3,380,158. The preferred first cutting means 63 has two offset roller cutters 67a and 67b that are stepped, however, creating shoulder portions 68a and 68b that impart added strength and flexibility to the roller cutters. Additionally, a sheet material support roller 53 extends outwardly from the side of the first cutting means 63 to prevent the weight of the sheet material itself from forcing the sheet down during cutting and causing the edges of the cut sheet to become scalloped or otherwise deformed. It should be appreciated that, because the cutting means are captured within a track that is attached to the bending brake, the cutting means cannot be knocked to the ground and broken.

In the preferred embodiment of the present invention, as best shown in FIG. 2, an elongated flat rigid hinged guide flap 22 runs along the full length of the bending brake 20 above the first track 62. The flap serves as a guide for aligning material in the brake prior to cutting. When the flap 22 is closed, its non-hinged edge extends to a point above and in line with the roller cutters of the first cutting means 63 so that the person operating the bending brake knows exactly along what path the first cutting means will cut. Without the flap, operators of the bending brake apparatus must measure the distance that the sheet material extends from the brake jaws along the entire length of such material and compare such measurements against the measured position of the cutting path to determine if such material appears properly aligned for cutting. This imprecise procedure typically requires more than one operator to make certain that when one end of the sheet material appears to be in proper alignment, the other end has not fallen out of alignment. With the flap, all that an operator need do to ensure a straight cut is line up the edge of the sheet material with the edge of the flap. Thus, it is easy to determine if the sheet material is properly aligned. It should be appreciated, therefore, that the flap makes it possible for just one operator to easily align sheet material in the brake prior to cutting.

Referring back to FIG. 1, a substantially rectangular foldable brake table 30 having a top surface 32 and a bottom surface 33 is positioned horizontally along the length of the back side 29 of the bending brake 20 and above the bending brake. The table edge closest to the back side 29 of the bending brake 20 is fixedly attached along the length thereof to the support castings 21. At least one table support member 28 pivotally mounted on the horizontal support rod 23 and extending underneath the brake table 30 from the back side 29 of the bending brake 20 engages an elongated bracket 31 on the bottom surface 33 of the table that runs lengthwise along the table edge farthest from the back side of the bending brake to secure the table to the bending brake. The brake table is preferably made of an easily foldable non-scratch material such as industrial POLYMESH. The brake table is, preferably, foldable to allow the table to be rolled up and secured to the bending brake (eg. by straps or clips) prior to transporting the brake. It should be appreciated that such table allows one to conveniently measure and mark sheet material for bending and/or cutting right where such bending and/or cutting is to take place—not at some distant makeshift worktable.

Figure 5:
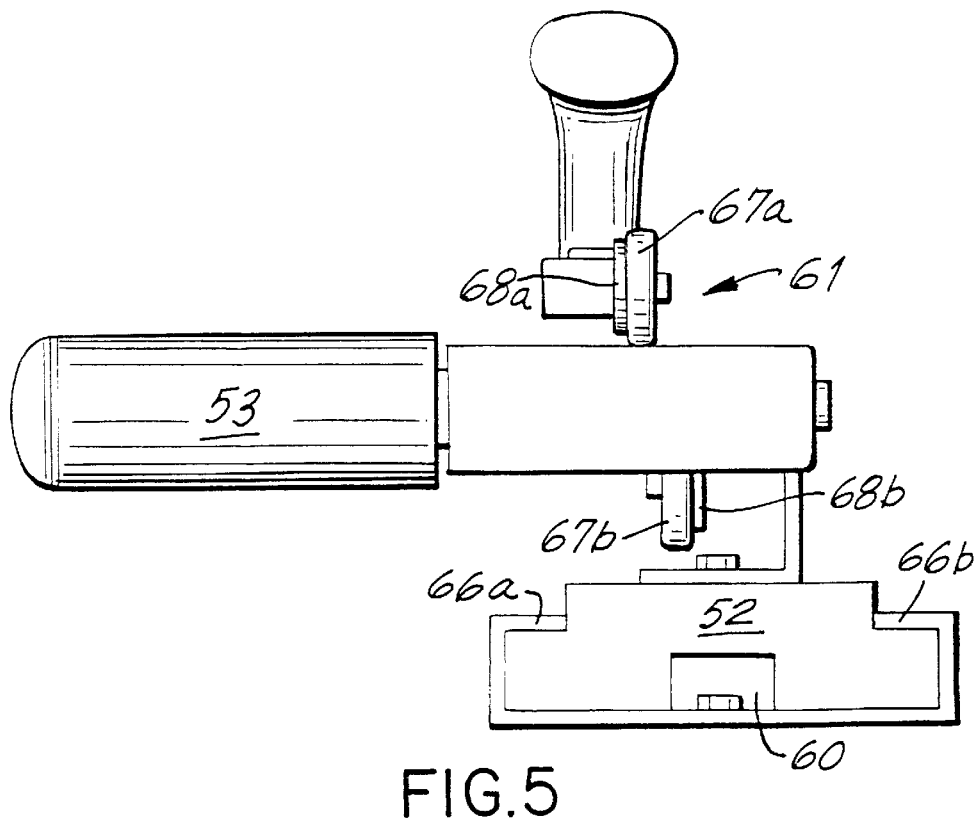
FIG. 5 is an end view of the preferred cutting tool of the coil holder of the present invention.
Figure 4:
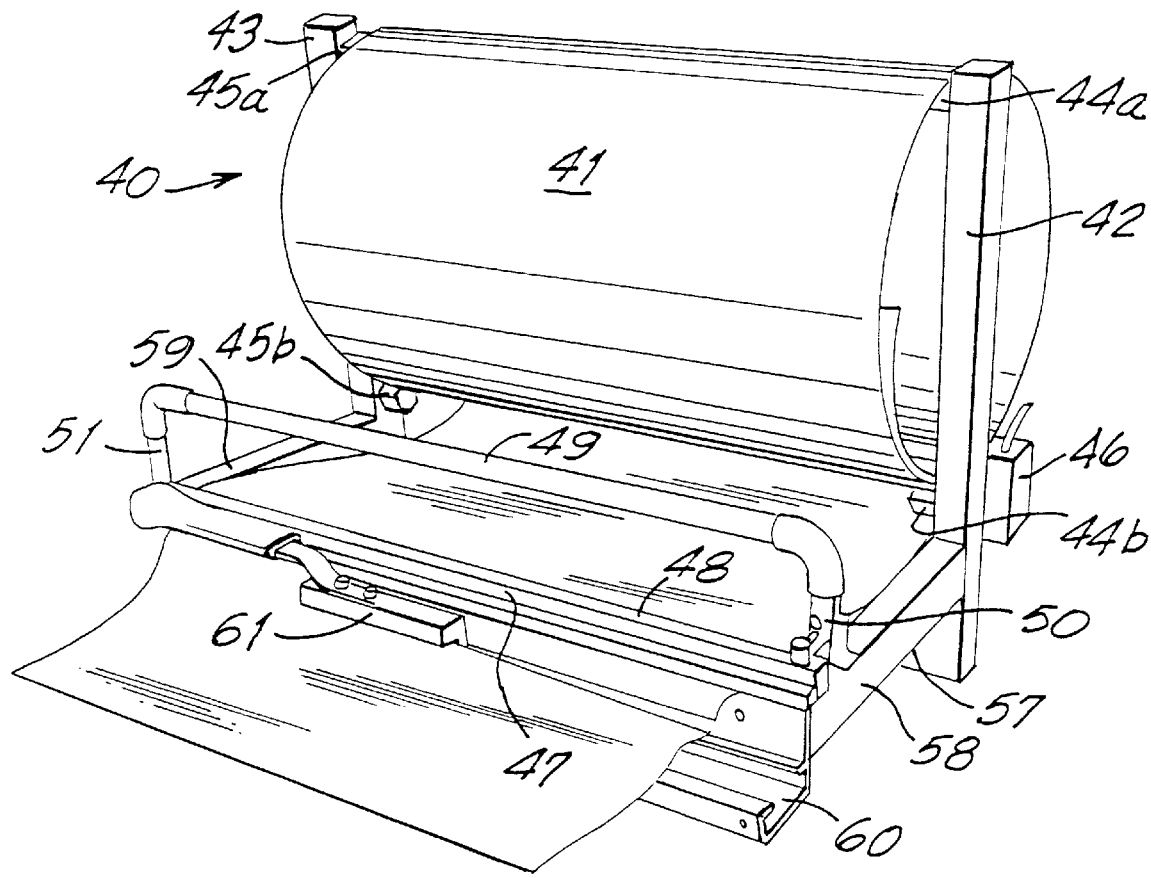
FIG. 4 is a fragmentary perspective view of the coil holder of the present invention.
Figure 4A:
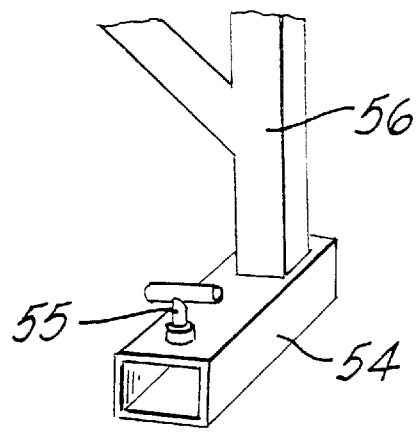
FIG. 4a is a fragmentary perspective view of the preferred means for attaching the coil holder of the present invention to the bending brake.
Figure 6A:
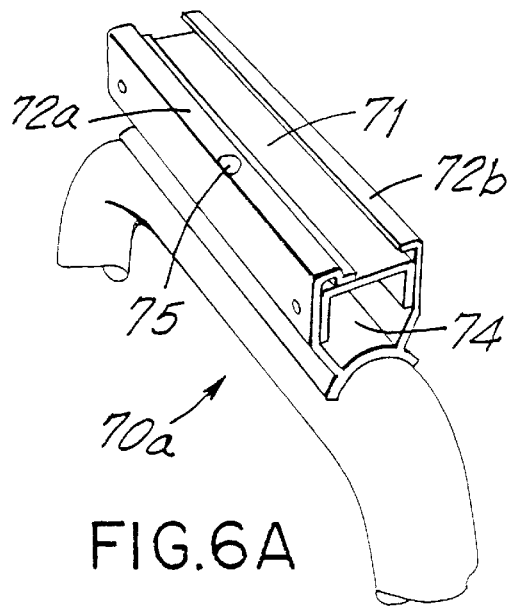
FIGS. 6a and 6b are fragmentary perspective views of the detachable brake support leg pairs of the present invention.
Figure 6B:
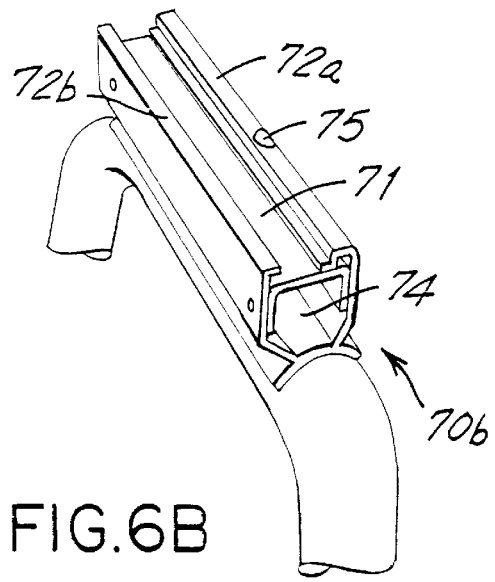

A coil holder 40 for holding a coil of a rolled material 41 such as aluminum or vinyl material is provided at one end of the brake table 30 and faces down the length of such table. As can best be seen in FIGS. 4 and 4a, the coil holder 40 includes a hollow frame member 54 having clamping means 55 for attaching to one end of the horizontal support rod 23 of the bending brake 20. The hollow frame member 54 is connected to a transverse horizontal frame support member 57 via a vertical frame connecting member 56. The coil holder 40 further includes opposing vertical coil support members 42 and 43 held spaced apart by the transverse horizontal frame support member 57. Each of the vertical coil support members 42 and 43 has a top portion, a bottom portion, an inner side, and an outer side. The inner sides of the top portions of the vertical coil support members include roller members 44a and 45a for supporting the coil of the rolled material 41 at its inside top edges. The inner sides of the bottom portions of the vertical coil support members 42 and 43 also include roller members 44b and 45b for supporting the coil of the rolled material 41 on its outside bottom edges. A receptacle 46 for holding pencils, rulers, small tools, and the like may be attached to one or both of the vertical coil support members. Parallel frame members 58 and 59 extend from the bottom portions of the vertical coil support members 42 and 43 in a direction parallel to the hollow frame member 54. The parallel frame members 58 and 59 support a clamping mouth 47 comprised of a transverse bar 48 coupled to two opposing clamps 50 and 51 interconnected by a manipulating handle 49. It should be appreciated that the manipulating handle makes it easy for one person to clamp in place sheet material fed from the coil. A second track 60 is formed beneath and along the length of the clamping mouth 47 and extends horizontally outward therefrom. As can best be seen in FIG. 5, second cutting means 61 is mounted on top of a second sliding bar 52 slideably captured beneath second rim portions 66a and 66b within the second track 60. Preferably, a portion of the second sliding bar 52 will protrude slightly past the second rim portions 66a and 66b and will be tapered slightly along its length in the direction of the cutting path to ease its passage through the second track 60. As with the first cutting means 63 described earlier, the second cutting means 61 has two offset roller cutters 67a and 67b that are stepped—creating shoulder portions 68a and 68b that impart added strength and flexibility to the roller cutters. A sheet material support roller 53 also extends outwardly from the side of the second cutting means 61 to prevent the weight of the sheet material itself from forcing the sheet down during cutting and causing the edges of the cut sheet to become deformed.

Figure 7:
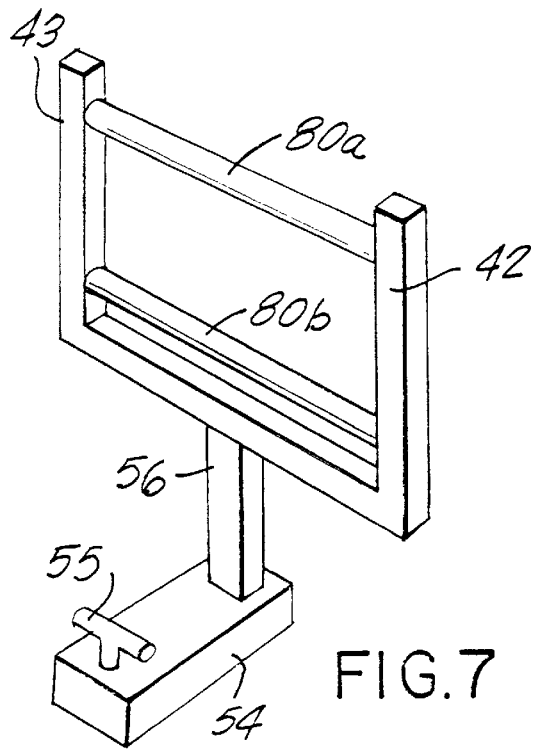
FIG. 7 shows an alternative embodiment of the coil holder of the present invention.

In an alternative embodiment of the coil holder of the present invention, as shown in FIG. 7, spring-loaded rollers 80a and 80b are provided in lieu of the roller members 44a, 45a, 44b, and 45b (shown in FIG. 4) and extend transversely between the inner sides of the vertical coil support members 42 and 43 at the top portions and bottom portions thereof. Such rollers 80a and 80b are preferably covered by a non-abrasive material, such as nylon mesh, to prevent scratching of the sheet material that they support. The rollers 80a and 80b may also be arranged and constructed to lock over the roller members 44a, 45a, 44b, and 45b rather than to replace them. It should be appreciated that the rollers can better accommodate sheet material of narrow widths than can the roller members.

Pairs of detachable brake support legs 70a and 70b connect to the underside of the bending brake 20 at both ends via integral interlocking members 71 that have first locking rim portions 72a and second locking rim portions 72b that engage the bending brake support castings 21. An opening 74 is defined beneath the first and second locking rim portions of each of the interlocking members 71. Each opening runs the length of each of the interlocking members.

It should be appreciated that each opening allows each pair of detachable legs to absorb shocks and to resist breakage. A rotatable retention piece 75 is mounted on top of each of the first locking rim portions 72a. When a given pair of brake support legs is attached to an individual brake support casting, its retention piece is rotated to overlap a portion of the support casting to prevent the pair of brake support legs from accidently disengaging such support casting should the bending brake apparatus be lifted or otherwise moved. It should be appreciated that the pairs of detachable support legs may be quickly and easily removed/attached from/to the bending brake.

Figure 8:
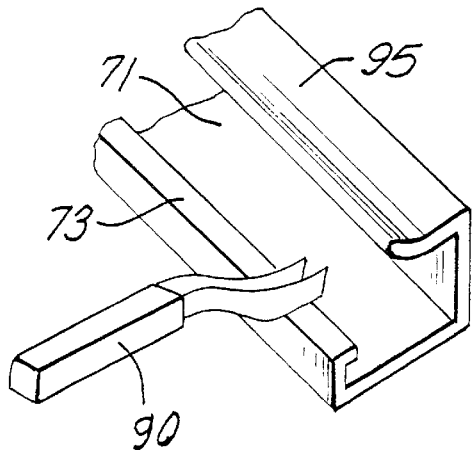
FIG. 8 is a fragmentary perspective view of an alternative embodiment of the interlocking member of a detachable brake support leg of the present invention.

In an alternative embodiment of the interlocking member 71 of a pair of brake support legs, as illustrated in FIG. 8, a receiving curve 95 replaces the second locking rim portion. A lower locking rim portion 73 replaces the first locking rim portion. The lower locking rim portion 73 is disposed lower than the first locking rim portion. A pivoting handle 90 is pivotally mounted on the lower locking rim portion 73 and engages the brake casting to provide sufficient leverage to secure the pair of legs thereto.

It should be appreciated that with the pairs of detachable legs removed, the bending brake apparatus, having the coil holder already removed and the brake table folded and secured to the brake, may be more easily loaded/unloaded onto/from the roof rack of a truck. Moreover, with the detachable legs removed, one may place the bending brake apparatus on a scaffold so that sheet material may be conveniently bent and/or cut right where work is being done—eliminating the need to pass material/workproduct down from and back up to such scaffold.

In sum, it should be appreciated that the bending brake apparatus heretofore described is readily transportable and permits coiled sheets of aluminum or vinyl material to be easily and safely cut, bent, or otherwise manipulated, in situ, by one or more workers at a job site to generate workproduct free of irregularities.

The foregoing disclosure and description of the invention is illustrative and explanatory thereof. Modifications to the present invention may be made within the scope of the appended claims, which scope is to be accorded the broadest possible interpretation, without departing from the true spirit of the invention. The present invention should be limited by only the following claims and their legal equivalents.

What is claimed is:

1. A bending brake apparatus comprising:

a bending brake with a longitudinal working side and a back side opposite said working side, the working side of the bending brake further including a workpiece bending door and workpiece clamping jaws connected adjacent said working side, said jaws being used for bending a sheet of material, a coil holder transversely mounted at one end of said bending brake for feeding a length of said sheet material across said bending brake in a direction parallel to said longitudinal working side: and a brake table horizontally oriented and connected to said bending brake for providing a working surface upon which is rolled out said sheet material, said working surface being foldable and rollable to provide a compact configuration when said table is not in use.

2. The bending brake of claim 1, further comprising a first track horizontally mounted along the length of said working side to a front surface of said bending door, wherein said first track includes a cutting tool mounted onto a sliding bar captured with said first track.

3. The bending brake apparatus of claim 2, wherein the cutting tool includes offset roller cutters, the roller cutters having shoulder portions for imparting strength and flexibility to the cutting tool.

4. The bending brake apparatus of claim 2, wherein the cutting tool includes a sheet material support roller extending outwardly therefrom for preventing the sheet material from being forced down by its own weight during cutting and causing irregular cuts or other deformities.

5. The bending brake apparatus of claim 2, wherein the first sliding bar comprises a protruding portion tapered for easing passage of the cutting tool through the first track when the cutting tool is pulled therethrough.

6. The bending brake apparatus of claim 1, wherein the bending brake further comprises an elongated flat rigid guide flap hingedly positioned above the first track and parallel thereto, the flap having an open and a closed position, the closed flap extending to a position above and in line with the first cutting means for guiding the alignment of the sheet material in the bending brake prior to bending and/or cutting.

7. The bending brake of claim 1 further comprising at least one table support member pivotally mounted to a back side of said bending brake and outwardly extendible therefrom.

8. The bending brake apparatus of claim 1, wherein the brake table is comprised of a foldable non-abrasive material.

9. The bending brake apparatus of claim 1, wherein the coil holder includes opposing coil support members, each of the coil support members having roller members for supporting the coil of the rolled sheet material.

10. The bending brake apparatus of claim 9, wherein the opposing coil support members are connected by at least one roller for supporting the coil of the rolled sheet material.

11. The bending brake apparatus of claim 10, wherein the roller(s) is(are) covered by a non-abrasive material.

12. The bending brake apparatus of claim 1, wherein the rolled sheet material is vinyl material.

13. The bending brake apparatus of claim 1, wherein the rolled sheet material is aluminum.

14. The bending brake apparatus of claim 1, wherein the coil holder includes a receptacle for holding pencils, rulers and small tools.

* * * * *